(12) United States Patent
Kinoshita et al.

(10) Patent No.: US 9,363,081 B2
(45) Date of Patent: *Jun. 7, 2016

(54) LICENSE ADMINISTRATION DEVICE AND LICENSE ADMINISTRATION METHOD

(75) Inventors: Shingo Kinoshita, Tokyo (JP); Koji Kawada, Tokyo (JP)

(73) Assignee: NEC Corporation, Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 14/129,396

(22) PCT Filed: Jun. 27, 2012

(86) PCT No.: PCT/JP2012/066387
§ 371 (c)(1),
(2), (4) Date: Dec. 26, 2013

(87) PCT Pub. No.: WO2013/002258
PCT Pub. Date: Jan. 3, 2013

(65) Prior Publication Data
US 2014/0133650 A1    May 15, 2014

(30) Foreign Application Priority Data

Jun. 29, 2011  (JP) .................... 2011-144190

(51) Int. Cl.
*H04L 9/16*  (2006.01)
*G06F 21/10*  (2013.01)

(52) U.S. Cl.
CPC ...... *H04L 9/16* (2013.01); *G06F 21/10* (2013.01); *G06F 21/105* (2013.01)

(58) Field of Classification Search
CPC .................................................. G06F 21/105
USPC ......................................................... 726/26
See application file for complete search history.

(56) References Cited

U.S. PATENT DOCUMENTS

| 7,096,282 B1 | 8/2006 | Wille |
| 2002/0080931 A1 | 6/2002 | Yamamoto et al. |

(Continued)

FOREIGN PATENT DOCUMENTS

| CN | 101174325 | 5/2008 |
| CN | 101933024 | 12/2010 |

(Continued)

OTHER PUBLICATIONS

International Search Report corresponding to PCT/JP2012/066387, dated Jul. 23, 2012, 4 pages.

(Continued)

*Primary Examiner* — Jacob Lipman
(74) *Attorney, Agent, or Firm* — Wilmer Cutler Pickering Hale and Dorr LLP

(57) ABSTRACT

A license administration device manages grant or denial of each optional function in a plurality of licensee devices. The licensee device stores key information encrypted with a cipher key so as to issue a license change request activating or restricting the predetermined optional function. Upon receiving a license change request restricting the predetermined optional function, the license administration device overwrites the key information of the licensee device with a default key. Subsequently, upon receiving a license change request activating the predetermined optional function, the license administration device applies an upgrade key to the key information of the licensee device. The default key or the upgrade key can be decrypted using a cipher key unique to the licensee device. The license administration device manages the licensed maximum for the predetermined optional function and reflects an increment or decrement to the licensing maximum by applying the default key or the upgrade key.

10 Claims, 7 Drawing Sheets

(56) References Cited

U.S. PATENT DOCUMENTS

| | | |
|---|---|---|
| 2002/0124168 A1 | 9/2002 | Mccown et al. |
| 2004/0039916 A1 | 2/2004 | Aldis et al. |
| 2004/0249762 A1* | 12/2004 | Garibay et al. ............ 705/59 |
| 2005/0060388 A1 | 3/2005 | Tatsumi et al. |
| 2007/0073872 A1 | 3/2007 | Wille |
| 2007/0107067 A1 | 5/2007 | Fountian |
| 2007/0192868 A1 | 8/2007 | Fujino |
| 2008/0104584 A1 | 5/2008 | Murata |
| 2008/0141378 A1* | 6/2008 | McLean .............. G06F 21/10 726/26 |
| 2009/0037650 A1 | 2/2009 | Wille |
| 2009/0235363 A1 | 9/2009 | Tomita |
| 2009/0274304 A1 | 11/2009 | Kobayashi |
| 2009/0292926 A1 | 11/2009 | Daskalopoulos et al. |
| 2011/0066721 A1 | 3/2011 | Shinomiya |
| 2011/0162079 A1 | 6/2011 | Amimoto |
| 2013/0003970 A1 | 1/2013 | Daskalopoulos et al. |

FOREIGN PATENT DOCUMENTS

| | | |
|---|---|---|
| EP | 1918842 | 5/2008 |
| JP | 2002-111894 A | 4/2002 |
| JP | 2003-506778 A | 2/2003 |
| JP | 2006-059163 | 3/2006 |
| JP | 2006-059164 | 3/2006 |
| JP | 2006-202017 A | 8/2006 |
| JP | 2006-217320 | 8/2006 |
| JP | 2007-034389 | 2/2007 |
| JP | 2007-058720 | 3/2007 |
| JP | 2008-117078 | 5/2008 |
| JP | 2010-218397 | 9/2010 |
| KR | 10-2005-0098833 A | 10/2005 |
| WO | WO-03/096136 A2 | 11/2003 |
| WO | WO-2004/019182 A2 | 3/2004 |
| WO | WO-2009/073969 A1 | 6/2009 |
| WO | WO-2009/075181 | 6/2009 |

OTHER PUBLICATIONS

Extended European Search Report issued by the European Patent Office for Application No. 12804925.1, dated Mar. 9, 2015 (6 pages).
Extended European Search Report issued by the European Patent Office for Application No. 12814183.5 dated Jun. 24, 2015 (7 pages).
International Search Report issued by the Japanese Patent Office as International Searching Authority for International Application No. PCT/JP2012/067747 dated Oct. 16, 2012 (4 pages—including translation).
Korean Office Action corresponding to Korean Application No. 2014-7002893, dated Dec. 29, 2015, 4 pages.

* cited by examiner

FIG. 4

(A) DEFAULT TABLE

| WIRELESS COMMUNICATION DEVICE | DEFAULT KEY |
|---|---|
| 10-1 | K1def |
| 10-2 | K2def |
| 10-3 | K3def |
| 10-4 | K4def |
| ... | |

(B) UPGRADE TABLE

| WIRELESS COMMUNICATION DEVICE \ FUNCTION | Capacity 10Mbps→100Mbps | Redundancy 1+0→1+1 | XPIC NotUsed→Used | Capacity +Redundancy | Capacity +XPIC | Redundancy +XPIC | Capacity +Redundancy +XPIC |
|---|---|---|---|---|---|---|---|
| 10-1 | K1c | K1r | K1x | K1cr | K1cx | K1rx | K1crx |
| 10-2 | K2c | K2r | K2x | K2cr | K2cx | K2rx | K2crx |
| 10-3 | K3c | K3r | K3x | K3cr | K3cx | K3rx | K3crx |
| 10-4 | K4c | K4r | K4x | K4cr | K4cx | K4rx | K4crx |
| ... | | | | | | | ... |

FIG. 5

| FUNCTION | LICENSING MAXIMUM |
|---|---|
| Capacity | 3 |
| Redundancy | 4 |
| XPIC | 1 |

LICENSE ADMINISTRATION DEVICE AND LICENSE ADMINISTRATION METHOD

CROSS-REFERENCE TO RELATED APPLICATIONS

The present application is a national stage application of International Application No. PCT/JP2012/066387 entitled "LICENSE ADMINISTRATION DEVICE AND LICENSE ADMINISTRATION METHOD," filed on Jun. 27, 2012, which claims the benefit of the priority of Japanese Patent Application No. 2011-144190 filed on Jun. 29, 2011, the disclosures of each of which are hereby incorporated by reference in their entirety.

TECHNICAL FIELD

The present invention relates to a license administration device and a license administration method, each of which manages grant or denial of a license in a licensee device performing its function according to key information.

BACKGROUND ART

Recently, a sales method which activates the function of each wireless communication device in accordance with a contract between a licenser and a licensee has been employed in order to sell wireless communication devices with limited functions, such as cellular phones and information terminals. Specifically, a wireless communication device, which performs its function according to key information defining various operations, stores key information indicating the limitation to the predetermined function in an initial condition, and then the function of a wireless communication device is activated by rewriting key information according to a license contract.

Patent Literature Document 1 discloses a method of changing key information in a wireless communication device. According to the method of Patent Literature Document 1, a licensee specifies a wireless communication device and requests the activation of its function with a support center, and therefore the support center generates and transmits an upgrade key. i.e. data used to update the key information of the wireless communication device, to a licensee's terminal. The licensee applies the upgrade key, which is received with the terminal, to the wireless communication device, thus updating the key information. In this connection, the upgrade key is unique data encrypted with a cipher key unique to the wireless communication device, which cannot be applied to other wireless communication devices. This is needed to prevent functions from being activated by other wireless communication devices, which are not covered by contracts, by way of illegal copying.

Patent Literature Document 2 discloses a license administration system which manages licenses of software products for each customer. It includes an agent which starts up and enables a software product based on a license key unique to a user terminal installing the software product therein, and an administration center which manages the issued license in response to a key issue request from the user terminal while generating, sending back, and storing a license key unique to the user terminal. Herein, it reads the unique ID of the user terminal so as to generate a media key recording the license information.

Patent Literature Document 3 discloses a license administration system which manages licenses of software products for customers, thus demonstrating the same functionality as Patent Literature Document 2. Herein, a shipment management center receives a media key and the name of a requested application so as to generate and send back a license key to an agent making a request under the maximum contacted quantity restricted by the licensed application software.

Patent Literature Document 4 discloses a license administration system adopting a license server which authenticates licenses while managing the contacted quantities of licenses and the currently used licenses. The license server sends a transfer license key, which is used to authenticate the license of a device executing a job input from a user terminal, to an authentication server, and therefore the authentication server authenticates the license of the job executing device by use of the transfer license key.

Patent Literature Document 5 discloses an installation management method of an information processing device, in which an application-installation management module generates counter information associated to a license ID for each application ID based on an application-installation request and license information received from a license management server, thus managing installation of software based on a license status represented by the counter information.

CITATION LIST

Patent Literature Document

Patent Literature Document 1: Japanese Patent Application Publication No. 2008-117078
Patent Literature Document 2: Japanese Patent Application Publication No. 2006-59163
Patent Literature Document 3: Japanese Patent Application Publication No. 2006-59164
Patent Literature Document 4: Japanese Patent Application Publication No. 2007-58720
Patent Literature Document 5: Japanese Patent Application Publication No. 2010-218397

SUMMARY OF INVENTION

Technical Problem

To additionally set or relocate wireless communication devices, licensees may need to request changing wireless communication devices whose functions are activated due to the additional setup and the relocation. For example, due to the additional setting of a wireless communication device B in addition to a wireless communication device A whose function has been already activated, a licensee may need to request deactivation of the function of the wireless communication device A while activating the function of the wireless communication device B.

Patent Literature Document 1 raises a problem that the foregoing upgrade key unique to each wireless communication device cannot be applied to other wireless communication devices. Patent Literature Documents 2 to 5 disclose the conventional technologies relating to software license administration methods but fail to disclose an upgrade key applied to key information of a licensee device.

The present invention is made in consideration of the foregoing problem, and therefore it is an object of the present invention to provide a license administration device and a license administration method, each of which allows a licensee to arbitrarily activate the function of a wireless communication device.

Solution to Problem

The present invention is directed to a license administration device which manages grant or denial of functions in a plurality of licensee devices achieving functions according to key information. The license administration device includes a key store part which stores a default key restricting the predetermined function and an upgrade key activating the predetermined function as the key information unique to the licensee device; a key extraction part which extracts the default key or the upgrade key in connection with the licensee device indicated by a license change request upon receiving the license change request restricting or activating the predetermined function; and a key application part which overwrites the key information of the licensee device with the default key upon receiving the license change request restricting the predetermined function. Upon receiving the license change request activating the predetermined function after overwriting the key information of the licensee device with the default key, the key application part applies the upgrade key to the key information of the licensee device.

The present invention is directed to a license administration system including a plurality of licensee devices achieving functions according to key information and a license administration device which manages grant or denial of functions in a plurality of licensee devices. The licensee device includes a key information store unit used to store unique key information and issues a license change request restricting or activating the predetermined function granted to or denied in the licensee device. The license administration device includes a key store unit which stores a default key restricting the predetermined function and an upgrade key activating the predetermined function as the key information for each licensee device; a key extraction part which extracts the default key or the upgrade key from the key store part in connection with the licensee device indicated by a license change request upon receiving the license change request; and a key application part which overwrites the key information of the licensee device with the default key upon receiving the license change request restricting the predetermined function. The key application part applies the upgrade key to the key information of the licensee device upon receiving the license change request activating the predetermined function after overwriting the key information of the licensee device with the default key.

The present invention is directed to a license administration method of managing grant or denial of functions in a plurality of licensee devices achieving functions according to key information. The license administration method includes the steps of: storing a default key restricting the predetermined function and an upgrade key activating the predetermined function as the key information for each licensee device; receiving a license change request restricting or activating the predetermined function from the licensee device; extracting the default key or the upgrade key in connection with the licensee device indicated by the license change request; overwriting the key information of the licensee device with the default key upon receiving the license change request restricting the predetermined function; and applying the upgrade key to the key information of the licensee device upon receiving the license change request activating the predetermined function after overwriting the key information of the licensee device with the default key.

The present invention is directed to a program applied to a license administration device managing grant or denial of functions in a plurality of licensee devices achieving functions according to key information. The program includes the same process as the license administration method.

The present invention is directed to a wireless communication device in which a license administration device manages grant or denial of optional functions. The wireless communication device is switched between a default state restricting the predetermined optional function and a granted state activating the predetermined optional function by use of unique key information under control of the license administration device.

The present invention is directed to a license change method applied to a wireless communication device in which a license administration device manages grant or denial of optional functions. The license change method includes the steps of: overwriting key information unique to the wireless communication device with a default key so as to establish a default state restricting the predetermined optional function in the wireless communication device when the license administration device receives a license change request restricting the predetermined optional function; and applying an upgrade key to the key information to establish a granted state activating the predetermined optional function in the wireless communication device when the license administration device receives a license change request activating the predetermined optional function.

Advantageous Effects of Invention

According to the present invention, the license administration device overwrites the key information with the default key unique to the licensee device, thus restoring the licensee device in the initial condition. Additionally, it applies the upgrade key, i.e. the differential information than the default key, to the key information, thus activating the predetermined function. The default key and the upgrade key can be decrypted using a cipher key unique to the licensee device. Thus, it is possible to prevent an erroneous operation due to illegal copy of key information by a holder in bad faith, and it is possible to arbitrarily restrict or activate functions in licensee devices.

BRIEF DESCRIPTION OF DRAWINGS

FIG. 4 shows lists of default keys and upgrade keys stored in a key store unit included in the license administration device.

FIG. 5 shows a list of licensing maximums for functions stored in a maximum store unit included in the license administration device.

DESCRIPTION OF EMBODIMENT

The embodiment of the present invention will be described in detail with reference to the accompanying drawings below.

Figure 1:
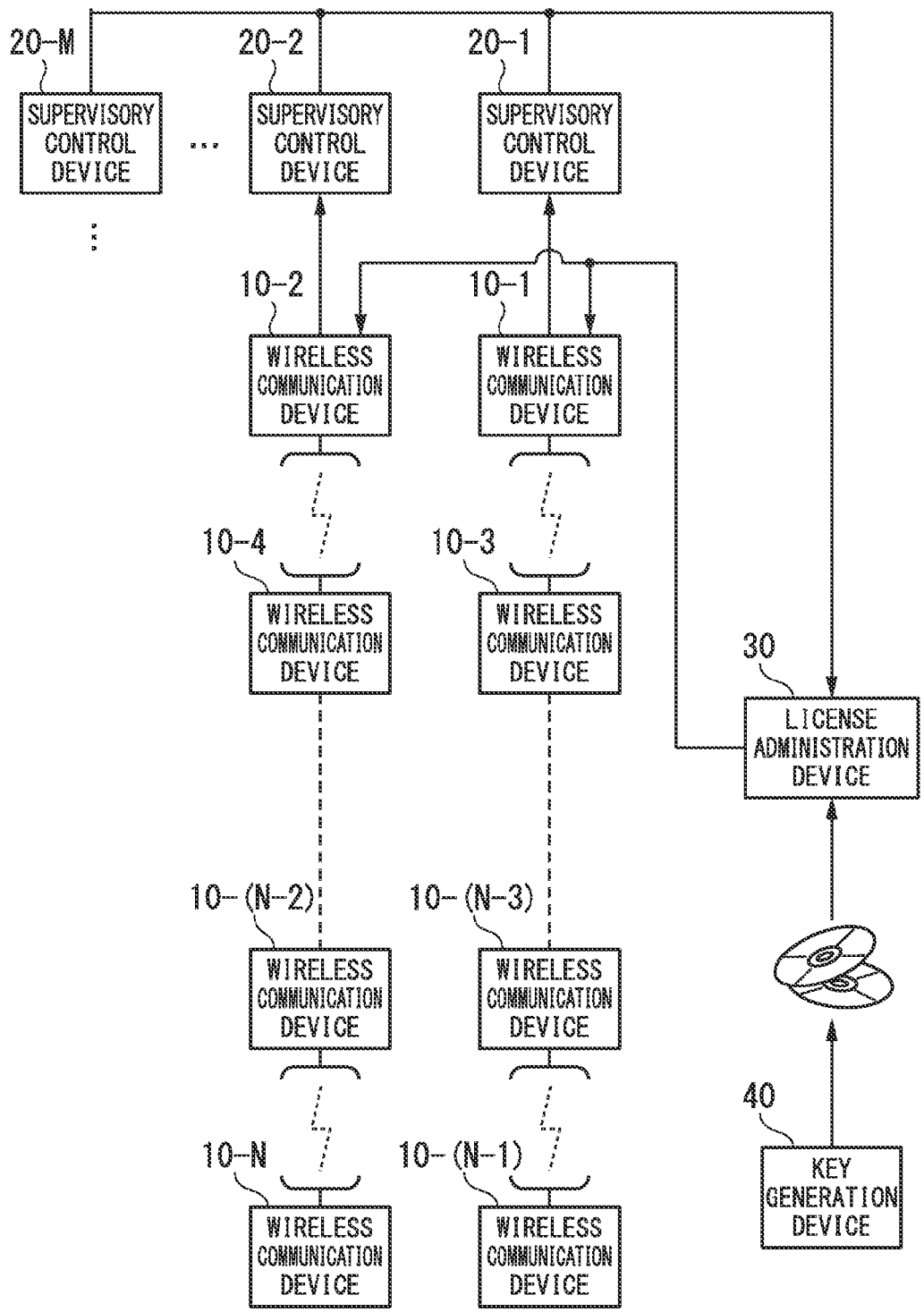
FIG. 1 is a block diagram of a license administration system according to the embodiment of the present invention.

FIG. 1 is a block diagram of a license administration system according to the embodiment of the invention. The license administration system includes a plurality of wireless communication devices (or licensee devices) 10-1 to 10-N (hereinafter, collectively referred to as wireless communication devices 10), a plurality of supervisory control devices (or licensee supervisory devices) 20-1 to 20-M (where N>M) (hereinafter, collectively referred to as supervisory control devices 20), a license administration device 30, and a key generation device 40. Herein, a licensee (e.g. a user, an operator, a purchaser etc.) possesses the wireless communication device 10, the supervisory control device 20, and the license administration device 30 while a licenser (e.g. an administrator, a vendor, a seller etc.) possesses the key generation device 40.

The wireless communication device 20 wirelessly communicates with the counterpart wireless communication device 10 via microwaves. For example, the wireless communication device 10-1 wirelessly communicates with the wireless communication device 10-3. At this time, wireless communication is carried out in accordance with key information stored inside the wireless communication device 10. As functions defined by the key information, it is possible to name a communication capacity, existence or nonexistence of a redundant configuration (Redundancy), existence or nonexistence of cross polarization interference cancellation (XPIC) application. For example, upon storing key information representing the communication capacity of 10 Mbps, nonexistence of redundancy, and nonexistence of XPIC application, the wireless communication device 10-1 wirelessly communicates with the wireless communication device 10-3 in accordance with the setting content of the key information. In this connection, the license administration device 30 is able to rewrite the key information.

The license administration device 30 transmits the key information to the wireless communication device 10 whose key information needs to be rewritten via the other wireless communication device 10 which is serially connected thereto via a communication line. For example, when the subsequent-stage wireless communication device 10 whose key information needs to be rewritten is connected to the license administration device 30 via the forestage wireless communication device 10, the license administration device 30 transmits key information, which is destined to the wireless communication device 10, to the forestage wireless communication device 10. The forestage wireless communication device 10 receives and transfers the key information to the subsequent-stage wireless communication device 10 indicated by its destination. In short, the forestage wireless communication device 10 serves as a router to transfer the key information to the subsequent-stage wireless communication device 10.

Figure 2:
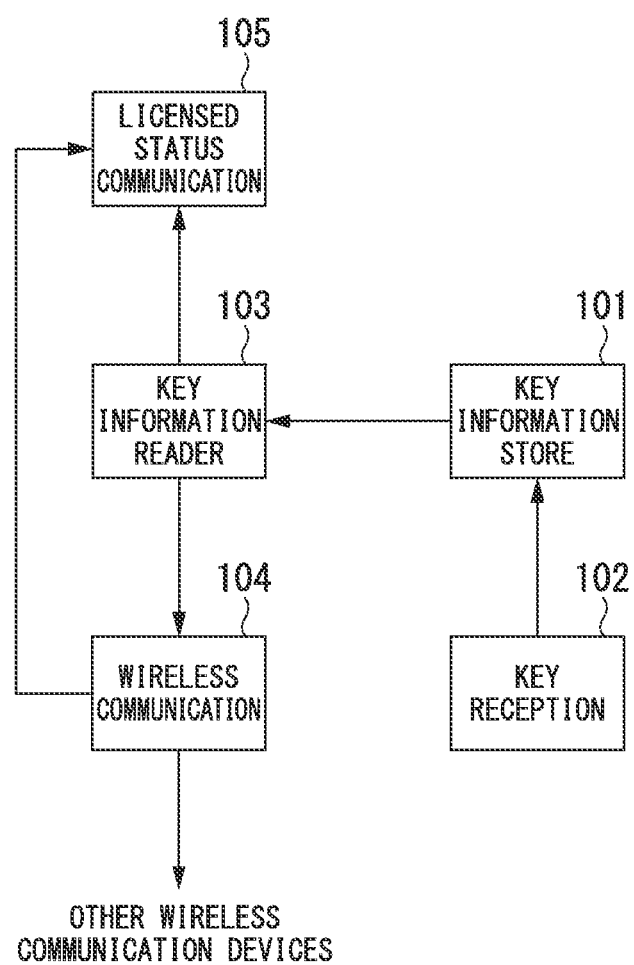
FIG. 2 is a block diagram of a wireless communication device included in the license administration system.

FIG. 2 is a block diagram showing the configuration of the wireless communication device 10.

The wireless communication device 10 includes a key information store unit 101, a key reception part 102, a key information reader 103, a wireless communication part 104, and a licensed status communication part 105. The key information store unit 101 stores the key information defining a wireless communication function implemented by the wireless communication part 104. In this connection, the key information store unit 101 stores the key information which is encrypted using a cipher key unique to the wireless communication device 10.

The key reception part 102 receives a default key from the license administration device 30 so as to overwrite the key information stored in the key information store unit 101 with the default key. Thus, it is possible to restore the key information stored in the key information store unit 101 to the original condition at shipment. The key reception part 102 receives an upgrade key, representing differential information than the default key, from the license administration device 30 so as to apply the upgrade key to the key information stored in the key information store unit 101. When wirelessly receiving key information (i.e. a default key or an upgrade key) from the other wireless communication device 10, the key reception part 102 receives the key information via the wireless communication part 104. When receiving key information from the license administration device 30 or the other wireless communication device 10 by wire, the key reception part 101 receive the key information via a connection port (not shown).

The key information reader 103 decrypts the key information stored in the key information store unit 101 by use of a cipher key unique to the wireless communication device 10, thus reading the function setting indicated by the key information. Based on the function setting read by the key information reader 103, the wireless communication device 104 notifies the supervisory control device 20 of the licensed status information, indicating the function activated in the wireless communication device 10, and the licensed status information, received from the counterpart wireless communication device 10, via the wireless communication part 104.

The supervisory control device 20 communicates with a plurality of wireless communication devices 10 which is connected thereto via communication lines so as to periodically acquire the licensed status information for each wireless communication device 10, thus notifying the licensed status information to the license administration device 30.

The license administration device 30 stores a default key. i.e. key information having an initial value unique to the wireless communication device 10, and an upgrade key, i.e. differential information between the key information activating the predetermined function and the default key. The license administration device 30 determines whether to apply the upgrade key to the wireless communication device 10 in response to the licensing maximum for function activation, which is determined in accordance with the contract between the licenser and the licensee.

The key generation device 40 inputs the identification information of the wireless communication device 10, which is sold by the licenser, to generate a default key and an upgrade key applied to the wireless communication device 10. Additionally, the key generation device 40 determines an increment or decrement to the licensing maximum of granting the predetermined function with respect to the wireless communication device 10 possessed by the licensee based on the contract between the licenser and the licensee. The licensing maximum is calculated for each function. For example, different licensing maximums are set for each function such that the number of wireless communication devices 10 allowed for XPIC application is set to "5" while the number of wireless communication devices 10 allowed for redundancy application is set to "2". In this connection, the key generation device 40 generates a default key, an upgrade key, and an increment or decrement to the licensing maximum, all of which are recorded in a recording medium such as a CD (Compact Disk) and applied to the license administration device 30 by the licenser.

Figure 3:
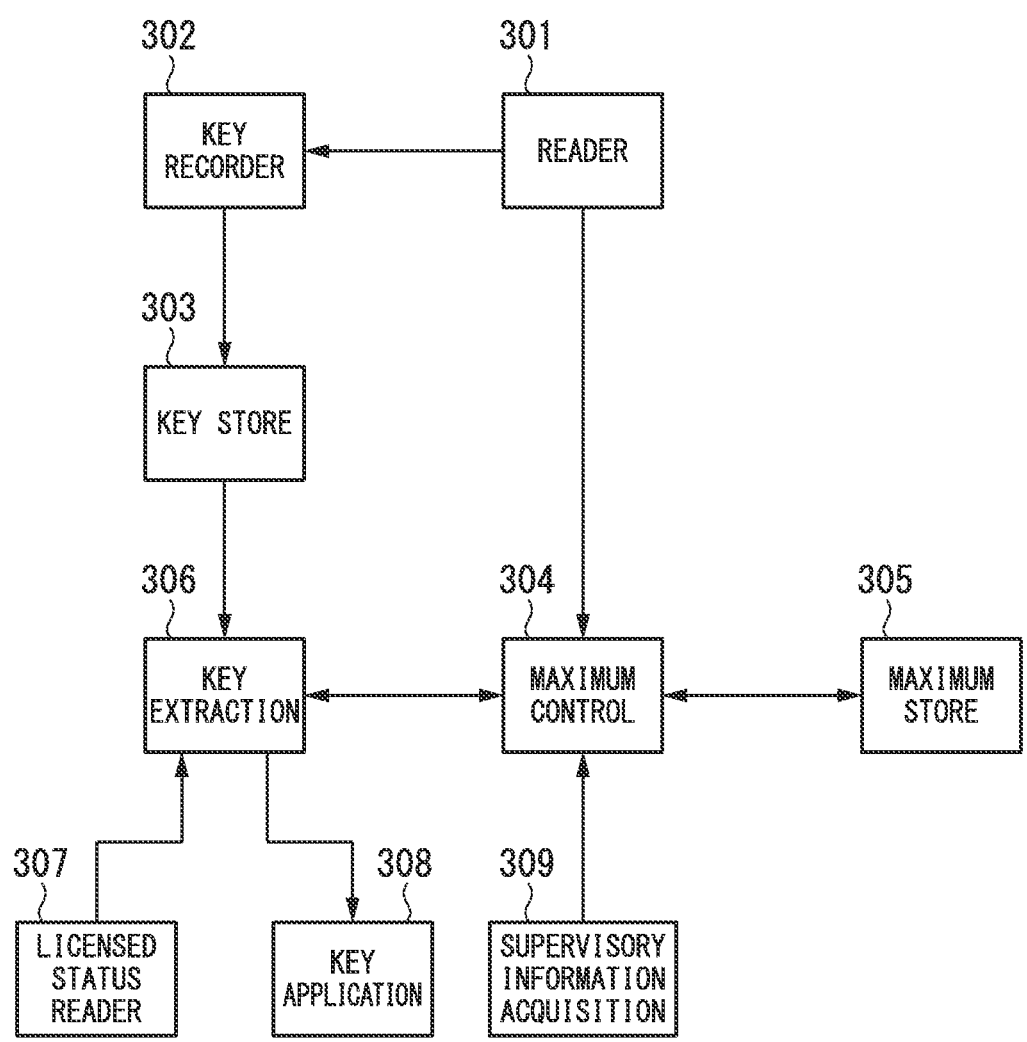
FIG. 3 is a block diagram of a license administration device included in the license administration system.

FIG. 3 is a block diagram showing the configuration of the license administration device 30.

The license administration device 30 includes reader 301, a key recorder 302, a key store unit 303, a maximum control part 304, a maximum store unit 305, a key extraction part 306, a licensed status reader 307, a key application part 308, and a supervisory information acquisition part 309.

The reader 301 reads a default key, an upgrade key, and an increment or decrement to the licensing maximum from a recording medium installed by the licensee. The key store unit 302 stores the default key and the upgrade key, which are read by the reader 301, in the key store unit 303. The key store unit 303 stores the default key and the upgrade key in connection with the identification information of the wireless communication device 10.

The maximum control part 304 updates the licensing maximum stored in the maximum store unit 305 based on an increment or decrement to the licensing maximum which is read by the reader 301. When the key extraction part 306 reads the default key and the upgrade key from the key store unit 303, the maximum control part 304 increases or decreases the licensing maximum stored in the maximum store unit 305 in response to the read keys. Additionally, the maximum control part 304 updates the licensing maximum stored in the maximum store unit 305 based on the supervisory information acquired by the supervisory information acquisition part 309. The maximum store unit 305 stores the licensing maximum, representing the number of devices which can be granted to each function, for each function activated in the wireless communication device 10.

The key extraction part 306 receives a license change request requesting function activation or function restriction from the licensee possessing the wireless communication device 10. The license change request includes the identification information of the wireless communication device 10, which is subjected to function activation or restriction, and the information representing the activated function. The key extraction part 306 extracts from the key store unit 303 the default key which is connected to the identification information included in the license change request, and the upgrade key which is connected to the identification information and the function information included in the license change request.

The licensed status reader 307 reads the licensed status information, relating to the licensed function of the wireless communication device 10, from the wireless communication device 10. The licensed status information indicates that any one of functions is activated among a plurality of functions limited by the default key. The key application part 308 stores the key information as the default key extracted by the key extraction part 306 in the wireless communication device 10 while applying the upgrade key extracted by the key extraction part 306 to the key information of the wireless communication device 10. The supervisory information acquisition part 309 acquires the supervisory information, representing the activated function of each wireless communication device 10 supervised by each supervisory control device 20, from the supervisory control device 20.

FIG. 4 shows lists describing the details of key information stored in the key store unit 303.

The key store unit 303 includes a default table storing default keys and an upgrade table storing upgrade keys. FIG. 4(A) shows the default table which stores the default key unique to the wireless communication device 10 in connection with the identification information of the wireless communication device 10. For example, the communication capacity is limited to 10 Mbps while no optional function requiring a license is set in the initial condition of the wireless communication device 10. By using the default key as the key information, the wireless communication device 10 is allowed to carry out wireless communication by way of the setting defining the communication capacity of 10 Mbps but precluding optional functions such as redundancy application and XPIC application. The default key is encrypted using a cipher key unique to the wireless communication device 10.

FIG. 4(B) shows the upgrade table which stores an upgrade key used to activate optional functions for each identification information of the wireless communication device 10 in connection with combinations of optional functions. The present embodiment provides three types of optional functions subjected to activation, i.e. a function to increase the communication capacity (Capacity), a function to apply redundancy (Redundancy), and a function to apply XPIC (XPIC). In this connection, optional functions subjected to activation are not necessarily limited to three types; hence, it is possible to set other optional functions subjected to activation. With Capacity application, the communication capacity is increased from 10 Mbps to 100 Mbps. Seven types of upgrade keys are provided and stored in the upgrade table. Specifically, seven types such as (1) Capacity application, (2) Redundancy application, (3) XPIC application, (4) Capacity and Redundancy application, (5) Capacity and XPIC application, (6) Redundancy and XPIC application, and (7) Capacity, Redundancy, and XPIC application are provided to the upgrade table. The reason why an upgrade key for each combination of optical functions is stored in the upgrade table in addition to an upgrade key for each function is that each upgrade key is differential data solely applied to a default key. Upgrade keys are each encrypted using a cipher key unique to the wireless communication device 10. Thus, even when an upgrade key issued to a desired wireless communication device 10 is illegally copied and applied to the key information of the other wireless communication device 10, it is possible to prevent the illegal transfer of the upgrade key because the upgrade key cannot be decrypted using a cipher key of the other wireless communication device 10.

Additionally, the contents of the default table and the upgrade table stored in the key store unit 303 are encrypted using a cipher key unique to the license administration device 30. Thus, even when the contents of the default table and the upgrade table are captured by way of illegal access, it is possible to prevent the default key and the upgrade key from being illegally used.

FIG. 5 shows a list of the stored content of the maximum store unit 305.

The maximum store unit 305 stores the licensing maximum for each optional function in connection with each optional function. The maximum store unit 305 having the stored content shown in FIG. 5 differs from the key store unit 303 storing the upgrade table shown in FIG. 4(B) in that it does not store a combination of optional functions but does store the licensing maximum in connection with a single optional function. Therefore, when the key extraction part 306 extracts an upgrade key, representing Capacity and XPIC application, from the key store unit 303, the maximum control part 304 reduce the licensing maximum, which is stored in the maximum store unit 305 in connection with Capacity, by one, while reducing the licensing maximum, which is stored in connection with XPIC, by one.

Next, the operation of the license administration system will be described in detail.

Figure 6:
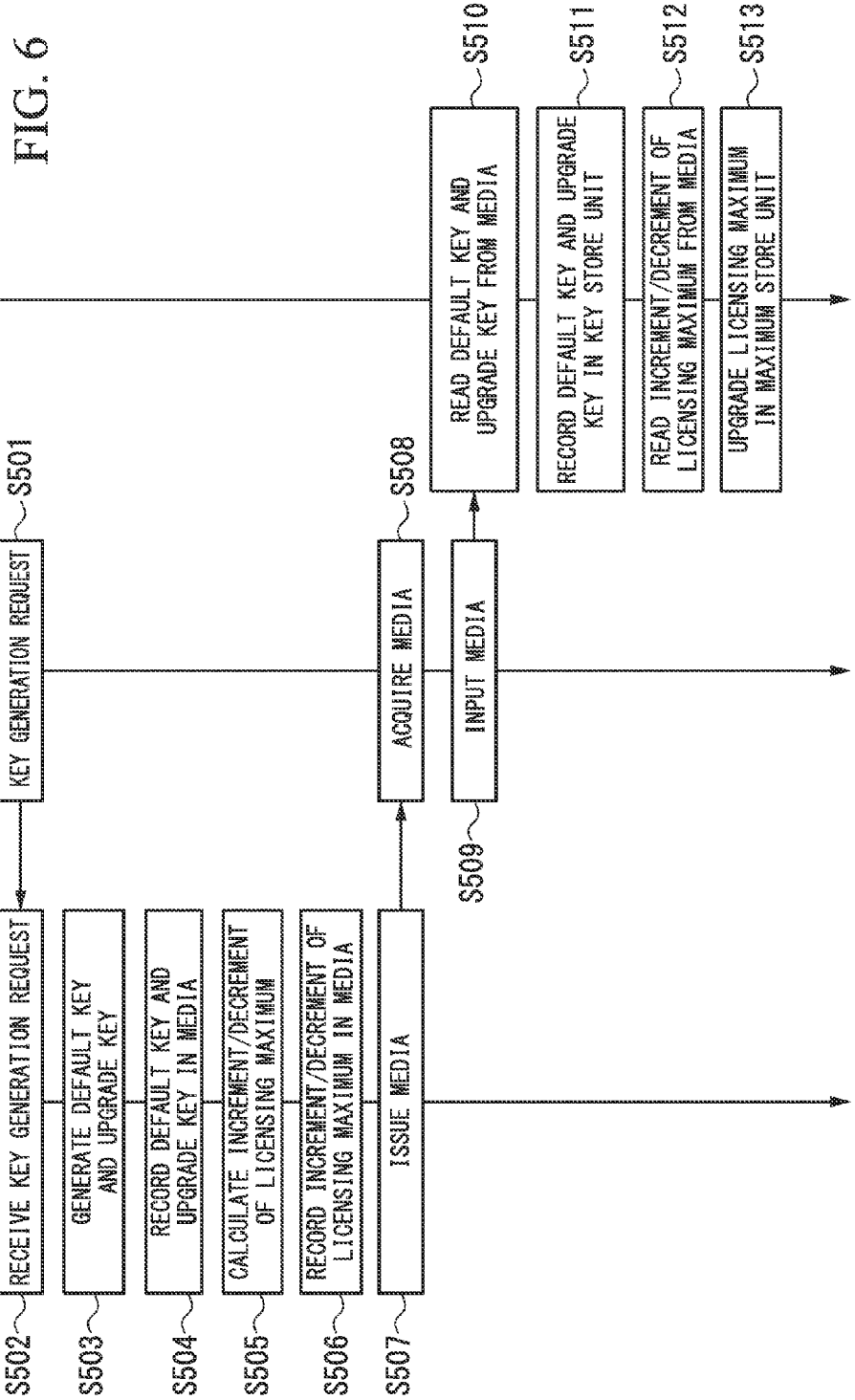
FIG. 6 shows a sequence diagram regarding the procedure of storing a default key and an upgrade key in the license administration device and the procedure of updating the licensing maximums for each optional function.

FIG. 6 shows a sequence diagram regarding the procedure of storing a default key and an upgrade key in the license administration device 30 and the procedure of updating the licensing maximum for each optional function.

When the licensee starts to manage licenses with the license administration device 30 or the licensee purchases a new wireless communication device 10, the licensee requests the key generation device 40 possessed by the licenser to generate a default key and an upgrade key used for the new wireless communication device 10 (step S501). A key generation request includes the identification information of the wireless communication device 10 which should be applied to the default key and the upgrade key. Specifically, the licensee issues the key generation request to request the licenser to issue the default key and the upgrade key, and then the licenser inputs the key generation request to the key generation device 40.

Upon receiving the key generation request (step S502), the key generation device 40 generates the default key and the upgrade key based on the identification information of the wireless communication device 10 (step S503). Since the key generation device 40 possessed by the licenser stores the identification information of the wireless communication device 10 and the cipher key unique to the wireless communication device 10, it encrypts the plain default key and the plain upgrade key by use of the cipher key, thus generating a default key and an upgrade key unique to the wireless communication device 10. Thereafter, the key generation device 40 encrypts the default key and the upgrade key by use of a cipher key unique to the license administration device 30 so as to store them in a predetermined recording medium in connection with the identification information of the wireless communication device 10 (step S504).

Next, the key generation device 40 calculates an increment or decrement to the licensing maximum of granting the predetermined optional function with the wireless communication device 10 possessed by the licensee based on the contract between the licenser and the licensee (step S505). Specifically, every time the licenser contacts with the licensee, the licenser sets the licensing maximum of granting the predetermined optional function to the key generation device 40, wherein the key generation device 40 calculates a difference between the licensing maximum which was set to issue a previous recording media and the newly set licensing maximum, thus producing an increment or decrement to the licensing maximum. Thereafter, the key generation device 40 encrypts the increment or decrement to the licensing maximum by use of a cipher key unique to the license administration device 30, thus storing it in a recording medium (step S506). Thus, the key generation device 40 issues a recording medium recording the default key, the upgrade key, and the increment or decrement to the licensing maximum (step S507).

The key generation device 40 issues a recording medium, which is transferred to the licensee by the licenser. The licenser receives the recording medium (step S508) and inputs the recording medium to the license administration device 30 (step S509). When the license administration device 30 receives the recording medium, the reader 301 reads the default key and the upgrade key as well as the identification information of the wireless communication device 10, which is connected to those keys, from the recording medium (step S510). Next, the key recorder 302 records the default key and the upgrade key, which are read by the reader 301, in the key store unit 303 in connection with the identification information of the wireless communication device 10 (step S511).

The reader 301 reads the licensing maximum from the recording medium (step S512). Next, the maximum control part 304 adds the increment or decrement of the licensing maximum, which is read by the reader 301, to the licensing maximum stored in the maximum store unit 305 (step S513).

Through the above process, the key generation device 40 generates the default key and the upgrade key which are stored in the license administration device 30, while the key generation device 40 generates the increment or decrement of the licensing maximum which is applied to the license administration device 30.

Next, the process of the license administration device 30 changing the optional function granted to the wireless communication device 10 will be described in detail.

Figure 7:
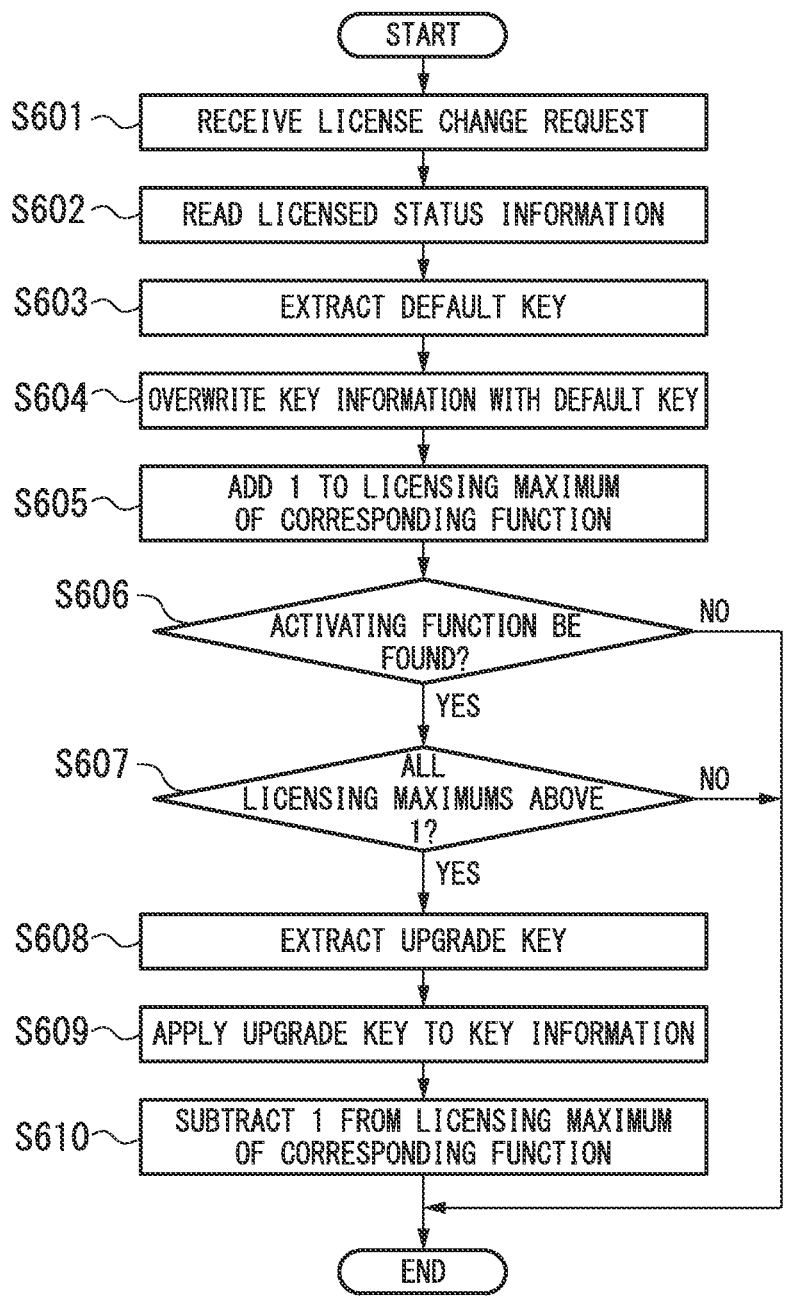
FIG. 7 shows a flowchart of the license administration device updating optional functions licensed to the wireless communication device.

FIG. 7 shows a flowchart regarding the process of the license administration device 30 changing the optional function granted to the wireless communication device 10. The licensee possessing the wireless communication device 10 sends a license change request, which requests activation or restriction of each optional function in the wireless communication device 10, to the license administration device 30, and then the key extraction part 306 of the license administration device 30 receives the license change request (step S601). The license change request includes the identification information of the wireless communication device 10 and each optional function to be activated. Next, the licensed status reader 307 reads from the wireless communication device 10 the licensed status information representing each optional function which was already granted to the wireless communication device 10 indicated by the identification information included in the license change request (step S602).

Next, the key extraction part 306 extracts the default key, which is connected to the identification information included in the license change request, from the key store unit 303 (step S603). Subsequently, the key application part 308 applies the default key as the key information of the wireless communication device 10 indicated by the identification information included in the license change request (step S604). The maximum control part 304 adds one to the licensing maximum which is stored in the maximum store unit 305 and connected to the optional information indicated by the licensed status information (step S605). Thus, the license administration device 30 applies the default key to the wireless communication device 10 so as to limit all the optional functions granted to the wireless communication device 10, thus increasing the licensing maximum regarding the limited optional function.

The key extraction part 306 determines whether or not the license change request includes an optional function to be activated (step S606). When it determines that the license change request includes an optional function to be activated (i.e. the decision result "YES" in step S606), the maximum control part 304 determines whether or not all the licensing maximums connected to the optional functions included in the license change request are above "1" (step S607). When it determines that all the licensing maximums stored in the maximum store unit 305 are above "1" (i.e. the decision result "YES" in step S607), the key extraction part 306 extracts an upgrade key, which is connected to an optional function or a combination of optional functions included in the license change request, from the key store unit 303 (step S608). Subsequently, the key application part 308 applies the upgrade key to the key information of the wireless communication device 10 indicated by the identification information included in the license change request (step S609).

Next, the maximum control part 304 subtracts one from the licensing maximum which is stored in the maximum store unit 305 and connected to the optional function to be activated included in the license change request (step S610). Then, the license administration device 30 exits the foregoing process. As described above, the license administration device 30 applies the upgrade key to the wireless communication device 10 so as to activate the optional function applied to the wireless communication device 10 while decreasing the licensing maximum with regard to the activated optional function.

When the foregoing step S606 determines that the license change request does not include any optional function to be activated (i.e. the decision result "NO" in step S606), or when the foregoing step S607 determines the existence of any optional function with the licensing maximum of "0" in the maximum store unit 305 (i.e. the decision result "NO" in step S607), the license administration device 30 exits its process without applying the upgrade key to the wireless communication device 10. When the step S607 determines the existence of any optional function with the licensing maximum of "0" in the maximum store unit 305, it is preferable for the license administration device 30 to output an error message such as "the selected optional function is short of its license count" before exiting its function.

Next, the process of the license administration device 30 managing the licensing maximum will be described in detail.

When the licensee purchases from the licenser a new wireless communication device 10 in which the predetermined optional function is activated in advance, the license administration device 30 needs to change the licensing maximum, which is stored in the maximum store unit 305, in response to the activated optional function. To cope with the circumstances, the present embodiment adopts the supervisory control device 20 to collect the licensed status information, indicating each optional function granted to the wireless communication device 10, thus periodically updating the licensing maximum based on the licensed status information.

Specifically, the supervisory control device 20 periodically acquires the licensed status information from a plurality of wireless communication devices 10 which are connected thereto via communication lines, thus notifying it to the license administration device 30. In the case of FIG. 1 in which a plurality of wireless communication devices 10 is serially connected to the supervisory control device 20, the supervisory control device 20 acquires the licensed status information from all the wireless communication devices 10 which are serially connected thereto. That is, the subsequent-stage wireless communication device 10, which is connected to the supervisory control device 20 via the forestage wireless communication device 10, transmits the licensed status information thereof to the forestage wireless communication device 10, which subsequently transmits its licensed status information to the supervisory control device 20 in addition to the licensed status information which is received from the subsequent-stage wireless communication device 10.

When the supervisory information acquisition part 309 of the license administration device 30 receives the licensed status information from all the supervisory control devices 20, the maximum control part 304 calculates the licensing maximum for each optional function with respect to the wireless communication device 10 based on all the licensed status information. It is possible to calculate the current licensing maximum by subtracting the granted count, which is calculated based on the licensed status information, from the licensing count which is determined in accordance with the contract between the licenser and the licensee. Subsequently, the maximum control part 304 overwrites the licensing maximum with the calculated licensing maximum in the maximum store unit 305.

This makes it possible for the license administration device 30 to update the licensing maximum stored in the maximum store unit 305 in response to the increased number of wireless communication devices 10 which should be administered. Since the license administration device 30 acquires the licensed status information from a plurality of wireless communication devices 1 via the supervisory control device 20, it is possible to prevent congestion of communication lines between the wireless communication devices 10 and the license administration device 30 in the process of updating the licensing maximum.

As described above, since the license administration device 30 overwrites the key information with the default key unique to the wireless communication device 10, it is possible to establish the default status of restricting all the optional functions in the wireless communication device 10. Additionally, the license administration device 30 applies the upgrade key to the key information, which is overwritten with the default key, so as to release restriction of the predetermined optional function. That is, when the licensee changes the device subjected to activation of the optional function from the predetermined wireless communication device 10 to the other wireless communication device 10, the licensee needs to input a license change request, which requests restricting the optional function in the predetermined wireless communication device 10, to the license administration device 30 while inputting another license change request, which requests activation of the optional function in the other wireless communication device 10, to the license administration device 30, thus changing the wireless communication device 10 subjected to activation of the optional function.

To change the activated state of the optional function, the license administration device 30 overwrites the key information with the default key and then applies the upgrade key (i.e. differential information than the default key) to the key information. Due to the process of changing the activated state of the optional function by use of the default key and the upgrade key, the license administration device 30 does not need to prepare a downgrade key, corresponding to differential data for each optional function, thus reducing the number of keys which should be retained as the key information.

Additionally, the license administration device 30 upgrades the licensing maximum stored in the maximum store unit 305 when the key application part 308 applies the default key or the upgrade key to the wireless communication device 10. In this connection, the key application part 308 does not apply the upgrade key, indicating the optional function with the licensing maximum "0", to the wireless communication device 10. Thus, the license administration device 30 is able to activate or restrict the optional function in the wireless communication devices 10 within the licensing count which is determined in accordance with the contract between the licenser and the licensee.

Heretofore, the present invention is described in detail with reference to the drawings, but the detailed configuration is not necessarily limited to the foregoing embodiment; hence, it is possible to produce various modifications within the scope of the invention as defined in the appended claims.

In the foregoing embodiment, every time a license change request is received, the licensed status reader 307 reads the licensed status information from the wireless communication device 10 so as to update the licensing maximum of each optional function based on the licensed status information; but this is not a restriction. For example, the supervisory information acquisition part 309 may acquire and store the licensed status information from the supervisory control device 20 so as to update the licensing maximum based on the licensed status information.

In the foregoing embodiment, the maximum store unit 305 stores the licensing maximum for each optional function; but this is not a restriction. The maximum store unit 305 may store the licensing maximum for each upgrade key. For example, it is possible for the maximum store unit 305 to store the licensing maximum for each upgrade key such that the licensing maximum regarding the upgrade key of Capacity application is set to "5"; the licensing maximum regarding the upgrade key of Redundancy application is set to "5"; and the licensing maximum regarding the upgrade key of Capacity and Redundancy application is set to "1". In this case, a single wireless communication device 10 is solely allowed to set Capacity and Redundancy application therein.

In the foregoing embodiment, the license administration device 30 reads default keys, upgrade keys, increments or decrements to licensing maximums via recording media; but this is not a restriction. For example, the license administration device 30 may directly read default keys, upgrade keys, and increments or decrements to licensing maximums from the key generation device 40 via telephone communication lines.

Each of the wireless communication device 10, the supervisory control device 20, the license administration device 30, and the key generation device 40 includes a computer system therein. The functions and processes of these devices 10 to 40 can be recorded in computer-readable recording media in the form of programs. That is, the computer system, included in each of the foregoing devices 10 to 40, may read and execute the predetermined program from recording media so as to implement functions and processes. Herein, computer-readable recording media refer to magnetic disks, magneto-optical disks, CD-ROM, DVD-ROM, semiconductor memory, and so on. Additionally, it is possible to distribute computer programs to computers via communication lines so as to enable each computer to execute the predetermined program.

In this connection, programs can be drafted to achieve a part of functions and processes installed in the foregoing devices 10 to 40. Alternatively, programs can be drafted as differential files (or differential programs) which are combined with programs preinstalled in computer systems so as to achieve functions and processes of the foregoing devices.

INDUSTRIAL APPLICABILITY

The present invention provides a license administration device and a license administration method, each of which is able to collectively manage optional functions granted to or denied in a plurality licensee devices; hence, the present invention is applicable to any licensee devices which are not necessarily limited to wireless communication devices but which embrace cellular phones, information terminals, and personal computers, thus allowing a licensee to arbitrarily activate or restrict optional functions in licensee devices which licensees possess within the licensing maximum for each optional function. Thus, it is possible to provide beneficial services to organizations and associations which possess plenty of information devices so as to allocate optional functions to those devices in accordance with contracts between licensers and licensees.

REFERENCE SIGNS LIST 10 wireless communication device
20 supervisory control device
30 license administration device
40 key generation device
101 key information store unit
102 key reception part
103 key information reader
104 wireless communication part
105 licensed status communication part
301 reader
302 key recorder
303 key store unit
305 maximum store unit
306 key extraction part
307 licensed status reader
308 key application part
309 supervisory information acquisition part

The invention claimed is:

1. A license administration device which manages grant or denial of functions in a plurality of licensee devices, comprising:
a key store part configured to store a default key restricting a predetermined function and an upgrade key activating the predetermined function in connection with the key information unique to each licensee device, the default key preventing each licensee device from applying any upgrade key;
a key extraction part configured to extract the default key or the upgrade key in connection with each licensee device in response to a licenser issuing a license change request representing an identification of each licensee device and the predetermined function to be restricted or activated; and
a key application part configured to overwrite the key information of the licensee device with the default key in response to the license change request restricting the predetermined function,
wherein, upon receiving the license change request activating the predetermined function after overwriting the key information of the licensee device with the default key, the key application part applies the upgrade key to the key information of the licensee device.

2. The license administration device according to claim 1, wherein the key information represents communication factors including at least one of a communication capacity, a redundancy, and an XPIC (Cross Polarization Interference Cancellation).

3. The license administration device according to claim 1, further comprising:
a maximum count store unit configured to store a maximum licensing count of granting the predetermined function to the plurality of licensing devices; and
a maximum count control part configured to update the maximum licensing count by increasing or decreasing the maximum licensing count when the key application part applies the default key or the upgrade key to the key information of each licensee device,
wherein if the maximum licensing count is not decreased to zero when the key extraction unit receives the license change request activating the predetermined function, the key application part applies the upgrade key to the key information of the licensee device, and wherein the default key is prepared in advance with respect to each licensee device.

4. The license administration device according to claim 3, wherein the maximum count store unit stores a plurality of maximum licensing counts with respect to a plurality of functions executable with the plurality of licensee devices,
wherein the key store unit stores a plurality of upgrade keys with respect to the plurality of functions and a plurality of combinations of functions, and
wherein the maximum count control part updates the maximum licensing count for each function by increasing or decreasing the maximum licensing count for each combination of functions when the key application part applies the default key or the upgrade key to the key information of each licensee device.

5. The license administration device according to claim 3, further comprising a licensed status reader configured to read licensed status information regarding the predetermined function in the plurality of licensee devices,
wherein the maximum count control part updates the maximum licensing count by increasing or decreasing the maximum licensing count regarding the predetermined function based on the licensed status information which is varied when the key application part applies the default key or the upgrade key to the key information of each licensee device.

6. The license administration device according to claim 5, further comprising a supervisory information acquisition part configured to acquire supervisory information by supervising the licensed status information with respect to the plurality of licensee devices,
wherein the maximum count control part updates the maximum licensing count by increasing or decreasing the maximum licensing count regarding the predetermined function based on the supervisory information.

7. A license administration system including a plurality of licensee devices and a license administration device configured to manage grant or denial of functions with the plurality of licensee devices,
wherein the licensee device includes a key information store unit configured to store key information unique to each licensee device, which is varied in response to a licenser issuing a license change request representing an identification of each licensee device and a predetermined function to be restricted or activated with each licensee device,
wherein the license administration device includes a key store unit configured to store a default key restricting the predetermined function and an upgrade key activating the predetermined function, the default key preventing each licensee device from applying the upgrade key,
a key extraction part configured to extract the default key or the upgrade key from the key store part in connection with each licensee device in response to the license change request, and
a key application part configured to overwrite the key information of each licensee device with the default key in response to the license change request restricting the predetermined function, and
wherein the key application part applies the upgrade key to the key information of each licensee device in response to the license change request activating the predetermined function after overwriting the key information of each licensee device with the default key.

8. A license administration method of managing grant or denial of functions in a plurality of licensee devices, comprising:
storing a default key restricting a predetermined function and an upgrade key activating the predetermined function;
receiving a license change request representing an identification of each licensee device and the predetermined function to be restricted or activated by a licenser, the default key preventing each licensee device from applying any upgrade key;
extracting the default key or the upgrade key in connection with each licensee device in response to the license change request;
overwriting the key information of each licensee device with the default key in response to the license change request restricting the predetermined function; and
applying the upgrade key to the key information of each licensee device in response to the license change request activating the predetermined function after overwriting the key information of each licensee device with the default key.

9. A wireless communication device in which a license administration device manages grant or denial of optional functions and which is switched between a default state restricting a predetermined optional function and a granted state activating the predetermined optional function by use of key information representing communication factors associated to optional functions under control of the license administration device, wherein the device comprises:
a key reception part configured to receive the key information encrypted with a cipher key;
a key information store unit configured to store the key information;
a key information reader configured to decrypt the key information by use of the cipher key to read a function setting; and
a wireless communication part configured to carry out a wireless communication based on the function setting,
wherein the default state restricting the predetermined function is established when the key reception part receives the default key overwriting the key information, and then the granted state activating the predetermined optional function is established when the key reception part receives the upgrade key applied to the key information.

10. A license change method applied to a wireless communication device in which a license administration device manages grant or denial of optional functions, comprising:
overwriting key information, representing communication factors associated to optional functions, unique to the wireless communication device with a default key so as to establish a default state restricting a predetermined optional function in the wireless communication device when the license administration device receives a license change request representing an identification of the wireless communication device and restricting the predetermined optional function; and
applying an upgrade key to the key information to establish a granted state activating the predetermined optional function in the wireless communication device when the license administration device receives a license change request representing an identification of the wireless communication device and activating the predetermined optional function.

* * * * *